US011393144B2

(12) United States Patent
Liu et al.

(10) Patent No.: US 11,393,144 B2
(45) Date of Patent: Jul. 19, 2022

(54) SYSTEM AND METHOD FOR RENDERING AN IMAGE

(71) Applicant: City University of Hong Kong, Kowloon (HK)

(72) Inventors: Qi Liu, Kowloon Tong (HK); Jeremiah B. Palmerston, Kowloon Tong (HK); Qi She, Kowloon Tong (HK); Ho Man Chan, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/381,172

(22) Filed: Apr. 11, 2019

(65) Prior Publication Data

US 2020/0327709 A1   Oct. 15, 2020

(51) Int. Cl.
*G06T 11/60*   (2006.01)
*G06T 7/11*    (2017.01)
*G06K 9/62*    (2022.01)

(52) U.S. Cl.
CPC ............ *G06T 11/60* (2013.01); *G06K 9/627* (2013.01); *G06K 9/6262* (2013.01); *G06T 7/11* (2017.01); *G06T 2207/20081* (2013.01)

(58) Field of Classification Search
CPC ...... G06F 16/35; G06F 16/5866; G06F 17/18; G06F 40/30; G06K 9/4671; G06K 9/46; G06K 9/6256; G06K 9/3241; G06K 9/6267; G06T 11/60; G06T 11/001; G06T 2207/20084; G06T 3/4046; G06N 3/0454; G06N 3/04; G06N 3/08
See application file for complete search history.

(56) References Cited

U.S. PATENT DOCUMENTS

| | | | |
|---|---|---|---|
| 10,187,690 B1* | 1/2019 | Garcia | H04N 21/44008 |
| 2014/0058735 A1* | 2/2014 | Sharp | G10H 1/0008 704/500 |
| 2018/0240257 A1* | 8/2018 | Li | G06T 11/001 |
| 2018/0253869 A1* | 9/2018 | Yumer | G06T 11/60 |
| 2019/0122071 A1* | 4/2019 | Jin | G06K 9/00268 |
| 2019/0236814 A1* | 8/2019 | Shlens | G06T 11/00 |
| 2019/0339371 A1* | 11/2019 | Dhatt | A61B 8/5215 |
| 2019/0370936 A1* | 12/2019 | Zhang | G06T 3/40 |
| 2020/0082002 A1* | 3/2020 | Whitman | G06F 16/5866 |
| 2020/0082249 A1* | 3/2020 | Hua | G06T 11/001 |

(Continued)

FOREIGN PATENT DOCUMENTS

WO   2015116582   8/2015

OTHER PUBLICATIONS

Mingming He, et al, "Progressive Color Transfer with Dense Semantic Correspondences", arXiv:1710.00756v2 [cs.CV] Dec. 12, 2018.

*Primary Examiner* — Jin Cheng Wang
(74) *Attorney, Agent, or Firm* — Renner Kenner Greive Bobak Taylor & Weber

(57) ABSTRACT

A system and a method for rendering an image including an image gateway arranged to receive content data representative of one or more objects and style data representative of one or more desired rendering styles; and an image manipulation engine arranged to process the content data and the style data to render a target image, wherein the target image includes a representation of the one or more objects and includes the one or more desired rendering styles.

19 Claims, 10 Drawing Sheets

(56) References Cited

U.S. PATENT DOCUMENTS

2020/0215294 A1* 7/2020 Lee .......................... B60Q 9/00
2020/0234034 A1* 7/2020 Savchenkov ............ G06N 3/04
2020/0234482 A1* 7/2020 Krokhalev .............. G06T 13/80
2020/0275873 A1* 9/2020 Xu ..................... G06K 9/00275

* cited by examiner

SYSTEM AND METHOD FOR RENDERING AN IMAGE

TECHNICAL FIELD

The present invention relates to a system and method for rendering an image, and particularly, although not exclusively, to a system and method for incorporating a desired style into an image.

BACKGROUND

Graphical expressions and representations, often in the form of what is now known as images, have regularly been drawn, viewed and appreciated by human beings. Images and other graphical representations, which may be expressed in the form of drawings, artworks, films, photographs or any other suitable expressions often evoke a response from a viewer. This response may include a logical interpretation of the contents of the images or an emotional response as triggered by the manner in which the representations are drawn, expressed or shown.

Such responses may be considered by artists, advertisers, photographers or producers as part of a process to create a suitable image, video or artwork to convey a desired effect. However, the assessment of this desired effect may be difficult to ascertain as it is highly subjective to each respondent. In turn, images that are powerful in triggering a desired response are often created by expert artists, photographers or producers who have vast experiences in working with content, design and art to create a desired effect.

Accordingly, producing an artwork, image or film with the desired effect is a costly and difficult exercise, usually only possible with the employment of skilled producers and artists at high expenses. Thus such productions are often left to large budget projects that would not be feasible for smaller content creators or those that wish to create content as a hobby.

SUMMARY OF THE INVENTION

In accordance with a first aspect of the present invention, there is provided a system for rendering an image comprising:
  an image gateway arranged to receive content data representative of one or more objects and style data representative of one or more desired rendering styles; and
  an image manipulation engine arranged to process the content data and the style data to render a target image, wherein the target image includes a representation of the one or more objects and includes the one or more desired rendering styles.

In an embodiment of the first aspect, the image manipulation engine is arranged to process the content data with a pre-trained learning process, wherein the pre-trained learning process is arranged to extract object related information from the content data.

In an embodiment of the first aspect, the image manipulation engine is arranged to process the style data to extract rendering styles related information.

In an embodiment of the first aspect, the style data is processed with the pre-trained learning process arranged to extract rendering styles related information.

In an embodiment of the first aspect, the pre-trained learning process is arranged to extract object related information from the content data by processing the content data with a plurality of iteration, wherein each iteration of processing reveals further object related information.

In an embodiment of the first aspect, the pre-trained learning process is arranged to extract rendering styles related information by processing the style data with the plurality of iterations, wherein each iteration of processing reveals further rendering styles related information.

In an embodiment of the first aspect, the target image is rendered by the pre-trained learning process arranged to combine the object related information and the rendering styles related information.

In an embodiment of the first aspect, the pre-trained learning process combines the object related information and the rendering styles related information with the plurality of iterations, wherein each iteration of processing renders the target image to include additional object related information and rendering styles related information.

In an embodiment of the first aspect, the each iteration of processing to render the target image is optimized.

In an embodiment of the first aspect, the rendering of the target image is optimized by minimizing losses with each iteration between the target image and the additional object related information and rendering styles related information.

In an embodiment of the first aspect, the pre-trained learning process is included in a neural network.

In an embodiment of the first aspect, the each iteration is a propagation of each layer of the neural network.

In an embodiment of the first aspect, he target image is optimized by use of an Adam optimizer.

In an embodiment of the first aspect, the content data includes one or more images showing one or more objects.

In an embodiment of the first aspect, the style data includes one or more images having a desired style.

In an embodiment of the first aspect, the pre-trained learning processes is pre-trained with an object training set to classify a plurality of objects.

In an embodiment of the first aspect, the pre-trained learning process is further pre-trained with a style training set to classify a plurality of styles.

In an embodiment of the first aspect, the object training set and/or the style training set are a plurality of images classified with object identification and/or style identification.

In an embodiment of the first aspect, the neural network is a convolution neural network.

In an embodiment of the first aspect, the one or more images showing one or more objects are one or more frames of an image stream.

In accordance with a second aspect of the present invention, there is provided a method for rendering an image comprising the steps of:
  receiving content data representative of one or more objects and style data representative of one or more desired rendering styles of the one or more objects; and
  processing the content data and the style data to render a target image to include a representation of the one or more objects, wherein the representation includes the one or more desired rendering styles.

In an embodiment of the second aspect, the step of processing the content data and the style data to render the target image includes processing the content data with a pre-trained learning process, wherein the pre-trained learning process is arranged to extract object related information from the content data.

In an embodiment of the second aspect, the step of processing the content data and the style data to render the target image further includes processing the style data to extract rendering styles related information.

In an embodiment of the second aspect, the style data is processed with the pre-trained learning process arranged to extract rendering styles related information.

In an embodiment of the second aspect, the pre-trained learning process is arranged to extract object related information from the content data by processing the content data with a plurality of iteration, wherein each iteration of processing reveals further object related information.

In an embodiment of the second aspect, the pre-trained learning process is arranged to extract rendering styles related information by processing the style data with the plurality of iterations, wherein each iteration of processing reveals further rendering styles related information.

In an embodiment of the second aspect, wherein the target image is rendered by the pre-trained learning process arranged to combine the object related information and the rendering styles related information.

In an embodiment of the second aspect, the pre-trained learning process combines the object related information and the rendering styles related information with the plurality of iterations, wherein each iteration of processing renders the target image to include additional object related information and rendering styles related information.

In an embodiment of the second aspect, the each iteration of processing to render the target image is optimized.

In an embodiment of the second aspect, the rendering of the target image is optimized by minimizing losses with each iteration between the target image and the additional object related information and rendering styles related information.

In an embodiment of the second aspect, the pre-trained learning process is included in a neural network.

In an embodiment of the second aspect, the each iteration is a propagation of each layer of the neural network.

In an embodiment of the second aspect, the target image is optimized by use of an Adam optimizer.

In an embodiment of the second aspect, the content data includes one or more images showing one or more objects.

In an embodiment of the second aspect, style data includes one or more images having a desired style.

In an embodiment of the second aspect, the pre-trained learning processes is pre-trained with an object training set to classify a plurality of objects.

In an embodiment of the second aspect, the pre-trained learning process is further pre-trained with a style training set to classify a plurality of styles.

In an embodiment of the second aspect, the object training set and/or the style training set are a plurality of images classified with object identification and/or style identification.

In an embodiment of the second aspect, the neural network is a convolution neural network.

In an embodiment of the second aspect, the one or more images showing one or more objects are one or more frames of an image stream.

In accordance with a third aspect of the present invention, there is provided a method for manipulating a neural network comprising the steps of:
  training the neural network to generate a trained network arranged to process images to extract object information from the images;
  removing a final output layer of the trained neural network; and
  replacing the final output layer with a layer of emotional states nodes arranged to represent one or more emotional states to generate a manipulated neural network.

In an embodiment of the third aspect, the manipulated neural network is further trained to extract emotion information from the images.

In an embodiment of the third aspect, the parameters of the trained network, except the final output layer, is retained within the manipulated neural network.

In an embodiment of the third aspect, the trained network is generated by training the neural network with an image classification database.

In an embodiment the image classification database is an ImageNet (image database organized according to the WordNet hierarchy) database or similar.

In an embodiment of the third aspect, the manipulated neural network is further trained by using an image emotion database.

In an embodiment the image emotion database is an International Affective Picture System (IAPS) dataset or similar.

BRIEF DESCRIPTION OF THE DRAWINGS

Embodiments of the present invention will now be described, by way of example, with reference to the accompanying drawings in which.

DETAILED DESCRIPTION OF ILLUSTRATIVE EMBODIMENTS

Figure 1:
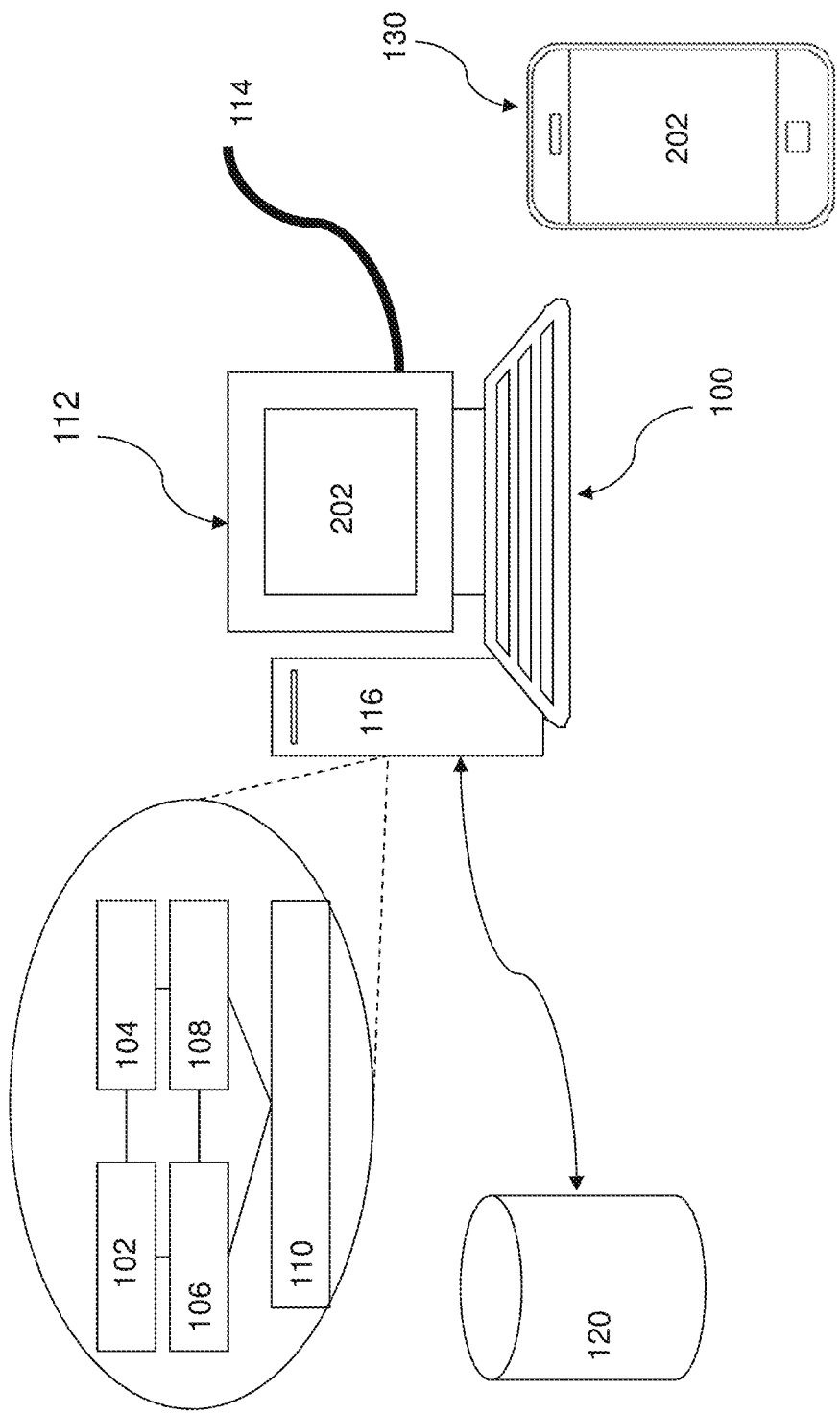
FIG. 1 is a block diagram of a computer system having example hardware and software components arranged to operate as one embodiment of a system for rendering an image.

Referring to FIG. 1, there is illustrated a block diagram of a computer system arranged to be implemented to operate as a system for rendering an image comprising:
  an image gateway arranged to receive content data representative of one or more objects and style data representative of one or more desired rendering styles; and an image manipulation engine arranged to process the content data and the style data to render a target image, wherein the target image includes a representation of the one or more objects and includes the one or more desired rendering styles.

As shown in FIG. 1, there is a provided a schematic diagram of a system for rendering an image which in this embodiment comprises a computer 100. The computer 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display, a touch sensitivity display or any other suitable display and communications links 114. The computer 100 includes instructions that may be included in ROM 104, RAM 106 or disk drives 108 and may be executed by the processing unit 102. There may be provided a plurality of communication links 114 which may variously connect to one or more computing devices such as a cloud based servers, general computer servers, other personal computers, terminals, smartphones, tablet computers, wireless or handheld computing devices. At least one of a plurality of communications link may be connected to an external computing or communication network through a local area network, wide area network, WiFi, Bluetooth, telecommunication network or other type of communications link.

The computer may include storage devices such as a disk drive 108 which may encompass solid state drives, hard disk drives, optical drives or magnetic tape drives. The computer 100 may use a storage drives, single disk drive or multiple disk drives. The computer 100 may also have a suitable operating system 116 which resides on the disk drive or in the ROM of the server 100.

The computer has a database 120 residing on a disk or other storage device which is arranged to store data for an image manipulation engine so as to process one or more images. The database 120 may also be accessible by an interface 202 of the computer 100 which allows a user to interact with the computer 100.

Preferably, the computer 100 may have access to images which are inputted by the user. These images may be accessed by input from a user or captured by use of a camera or other forms of optical sources. In this illustration, the computer 100 may be connected to a camera to capture these images, although in other examples, the computer 100 may be in the form of a tablet computer or smartphone 130 which includes its own camera to capture images as required by the user.

These images may also include one or more source images which may have a representation of one or more objects within the image. Such objects may include the subject of an image, such as a photo subject (person, car, animal, object) or simply be a combination of lines, shapes, rendering or colours as in the case of artworks. It would be appreciated by a person skilled in the art that the image may have various and many combinations of objects or subjects or any content as desired by the creator of that image and thus the term "object" could include any object, subject or any content or its classification.

The source image is intended to be supplied by a user for manipulation by the system for rendering an image. In addition to this source image, another image the user may also input into the system is the style image, which is an image that captures or represents a particular desired emotion a user may want to use to manipulate the source image. The style image may be any image that may or may not have a particular object or subject and need not to have any association or correlation with the object or subject of the source image. However, the style image would preferably include various rendering styles that convey or represents a particular desirable emotion rating or score to the user. In turn, the style image may be processed by the system for rendering an image so as to allow the system to render the source image with aspects of the styles that are found in the style image. The results may effectively change the emotion rating or score of the source image. Alternatively, a user may also input style data into the system instead of the style image. Such style data may already include a pre-determined rendering style expressed in data, rather than in a visual image as is the case with a style image.

Figure 2:
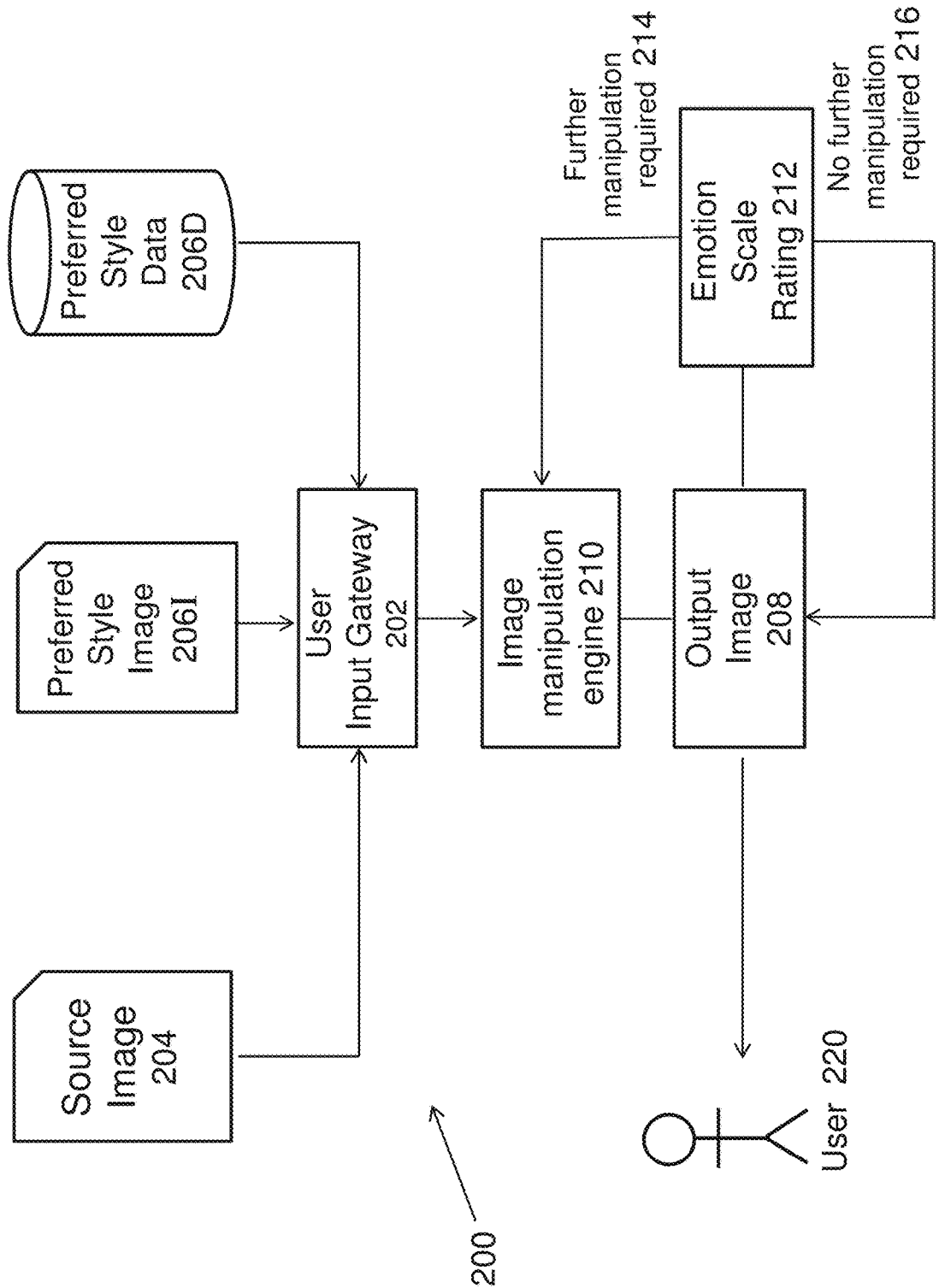
FIG. 2 is a block diagram of one example embodiment of a system for rendering an image.

With reference to FIG. 2, there is illustrated a block diagram for one example of the system for rendering an image 200. In this example embodiment, the system 200 may be implemented in hardware, software or a combination of both, but preferably deployed on a portable computing device such as a smartphone, smart glasses, tablet computers or wearable devices. The system may be arranged to include a user input gateway 202 arranged to receive an input source image 204. This image 204, which may also be referred to as an inputted source image 204, may be a digital image of any one or more objects such as a digital photo which was taken by a camera or obtained from an external source (such as the internet or database) by a user and would have one or more objects therein, thus the image may be referred to as having content data representative of one or more objects. The image 204 may also be a frame or combination of frames of a video, image streams, or any other multimedia representations. Additionally, the image 204 need not be of two dimensions, but can be a collective set of data which can be used to create a three or multi dimension multimedia, or may be in the form of digital data that represents other forms of data structures.

As described above, the gateway 202 is arranged to receive this source image 204 from an image source, which may in some examples, include a user selected digital photo or video from a selected library. The gateway 202 may then proceed to receive the style data 206I, 206D. This style data 206I, 206D may include a representation (in the form of an image 206I or other forms of rendering data 206D) of a rendering style in which the user would desire to incorporate into the source image 204 so as to produce a new image by changing the source image 204 to include a desired rendering style that will change the emotion rating, level or response of the source image 204. Such a desired style may include various rendering methods, colour schemes and choices, layout arrangements, edge rendering methods, contrasts, font sizes and types, brightness/darkness, and other imaginary styles that can change the appearance of an image.

In many instances, the desired style is chosen by a user to modify the source image 204 to a desired visual effect. This visual effect may be, in one example, to change the emotional rating or score of the source image 204 such that the source image 204 may be presented in a new image with a desired emotional rating or score. In turn, allowing the new image to convey a different emotional rating to its viewer. Examples of such transformation of an image from a source image 204 to a new output target image 208 having a different emotional rating may include the transformation of a source image 204 from having an emotional rating as based on its rendering style of "calm" to being transformed into a output target image 208 with an emotional rating as based on its new rendering style to be "excited".

Example embodiments of transformation of images is particularly useful in imaging or media processing industries whereby images, videos or other multimedia may be processed to transform its emotional response from one form to another. Such embodiments are useful in various settings from entertainment where users can change the emotional response of an image they take with their camera, to advertising agents, designers, artists or the like who may manipulate the emotion response of an image to one that is desired. Advertisers for example, may want to convey a sense of calm and serenity with their product, and thus convert artwork images to convey this type of emotion response. Similarly, movie producers may use embodiments of the system to transform a portion of a movie to a desired emotion effect so as to convey a desired emotional response from their audience.

As shown in FIG. 2, once the gateway 202 receives the style data 206I, 206D (in an image or data) and a source image 204, the gateway 202 may then proceed to transmit the source image 204 and style data 206I, 206D to an image manipulation engine 210. Preferably, the image manipulation engine 210 is arranged to generate an output image 208, also referred to as a target image 208, which would include compositions of the source image 204 as well as the style data 206I, 206D to create an output image 208 that could be recognized, preferably visually, by a user to have incorporated aspects of the source image 204 and the style data 206I, 206D. Examples of a target image may include, without limitations:

Once the image manipulation engine 210 generates the output image 208, the image may then be returned to the user 220 for review, or optionally, as shown in FIG. 2, the target image 208 may also be further processed by an emotion analysis engine 212 to determine an emotion score or rating. In these examples, if the score is below a certain predetermined threshold 214, the user may choose to have the image manipulation engine 210 further process the output image 208 again to generate a further output image 208 which may again be tested by the emotion analysis engine 212. This process can be repeated until the score from the emotion analysis engine 208 reaches or exceeds a predetermined threshold 216 after which the image is deemed to have been manipulated sufficient for the user 220.

Preferably, as it will be further described below, the image manipulation engine 210 may be implemented by use of a trained convolution neural network (CNN) arranged to perform the object classification process required to identify the objects as represented in a source image 204, and a style extract process whereby a preferred rendering style can be extracted from a style image 206I. Once these steps are performed, the CNN, by use of filters at each layer within the CNN, may also be implemented to extract object data and style data for rendering into a target image 208 so as to perform these example image manipulation functions. Aspects of the image manipulation engine and an example embodiment on its implementation by use of a trained convolution neural networks (CNN) to achieve the aforementioned functions, will be described further below with reference to FIGS. 3A to 5C.

| Source Image Description | Desired Style Image/Data Description | Target Image Description |
|---|---|---|
| A artwork of a flower | A colourful rendering style that evoke a sense of happiness and joy | artwork with the flower but rendered with colour and conveys a sense of happiness and joy |
| a photo of a gun | a dark and ominous stormy background with clouds and darkness | photo with the gun rendered with a dark tone to convey a negative and ominous emotion |
| a scene of cattle grazing in green fields on a sunny day | a cold and wintery scene with snow and ice | a scene of cattle grazing in wintery conditions, rendered in minimal colours with white washing tones to convey a cold and wintery environment |
| a photo of a dark and plain office | a colourful image of flower beds with natural sunlight on a sunny day | a photo of a sunny and bright office with vibrant colours to convey a scene of a joyous office environment |

It is important to emphasise that there are many such examples of this incorporation of the different aspects of the source image 204 and the style data 206I, 206D to create the output image 208. In one preferred example, as it will be explained below with reference to FIG. 5A, the creation of the output image 208 is by rendering of a random noisy image with the objects identified in the source image 204. This rendering process is further performed by use of rendering styles that are associated with the desired style data as provided to the gateway 202. In turn, the rendering of the objects onto the random noisy image is performed by use of rendering styles that are associated with a desired emotional rating and thus attempts to create a target image 208 that has the objects as identified in the source image 204, but rendered to include rendering styles as wanted by a user to change the emotion score or rating of the image as determined by the style data 206I, 206D.

Figure 3A:
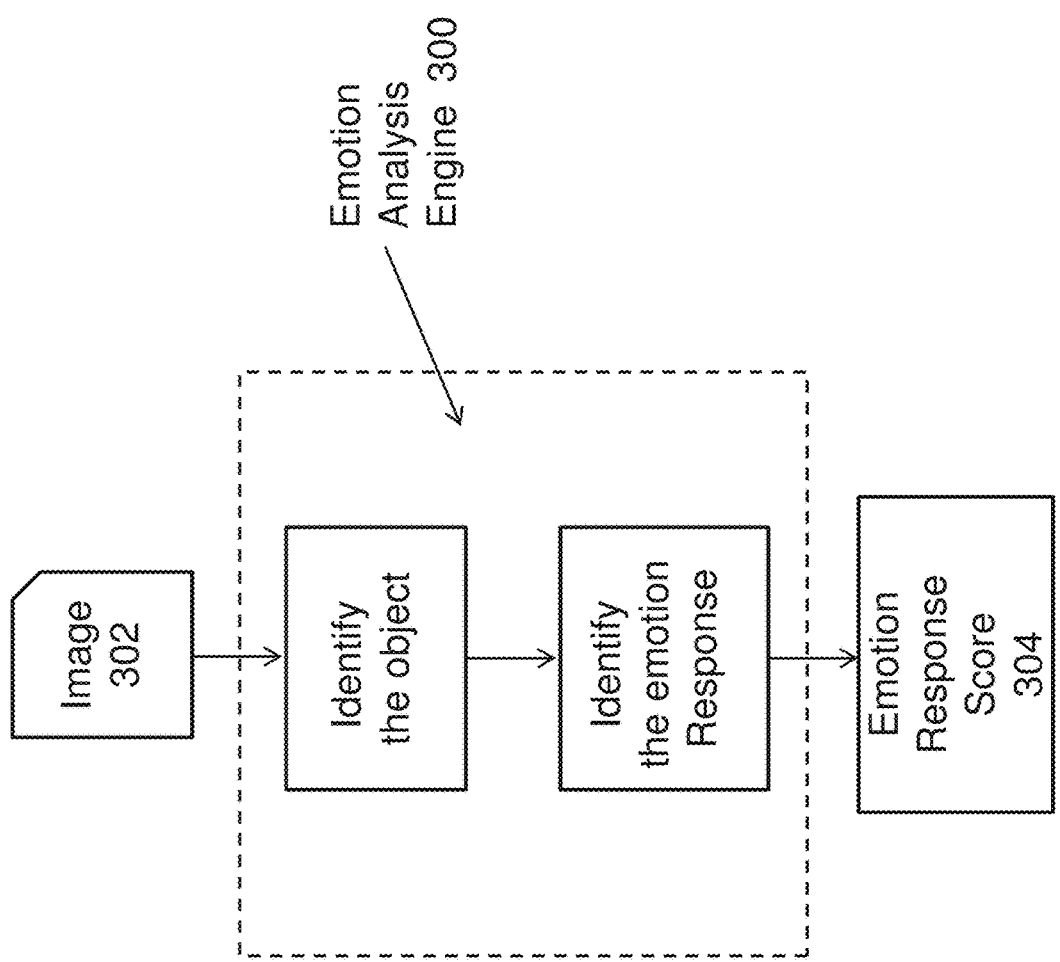
FIG. 3A is a block diagram of an example emotion analysis engine, which may optionally be used in the system for rendering an image of FIG. 2.
Figure 4A:
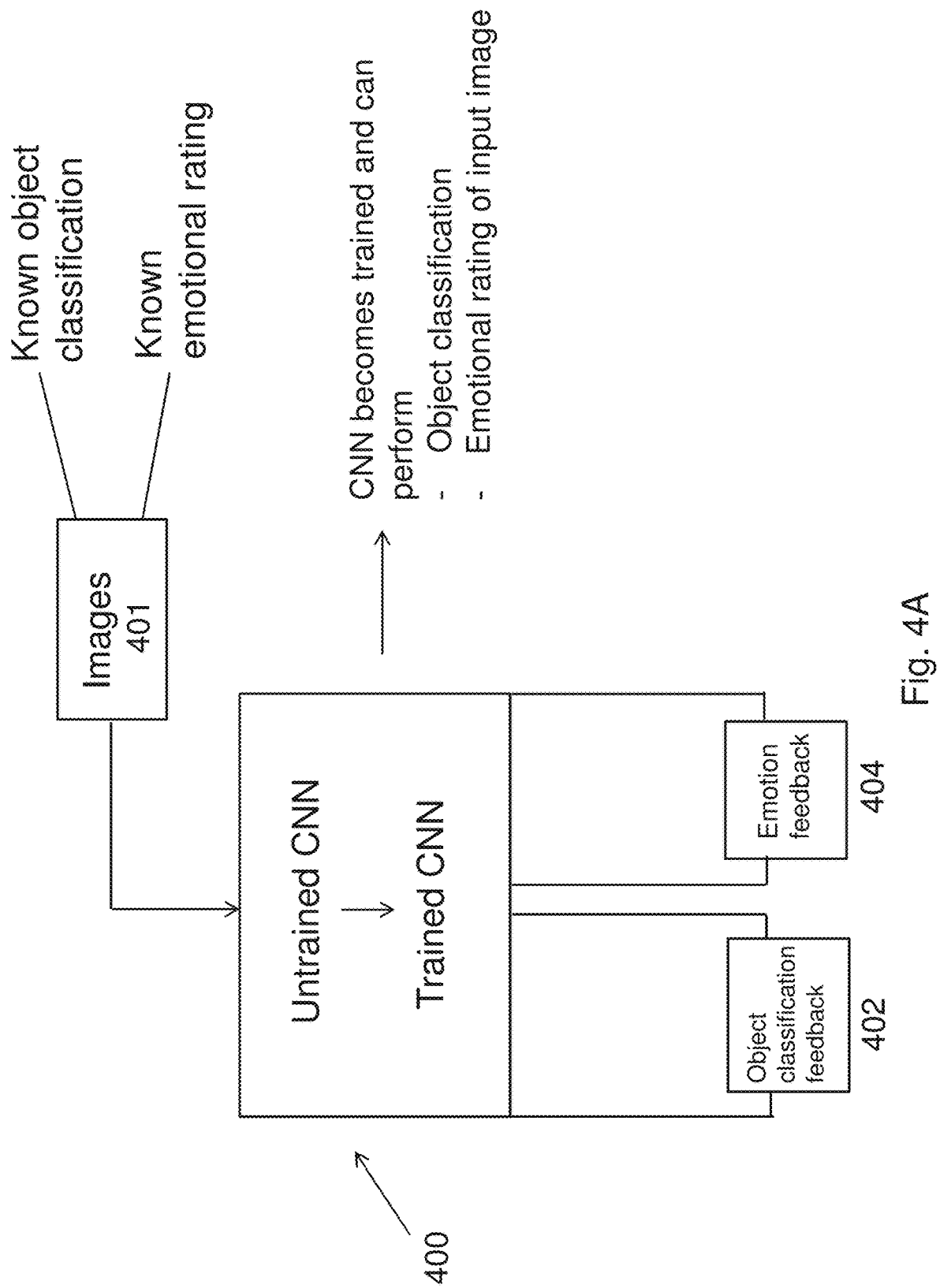
FIG. 4A is a block diagram of an example convolution neural network (CNN) which may be trained to operate as one component of the system for rendering an image of FIG. 2.
Figure 4B:
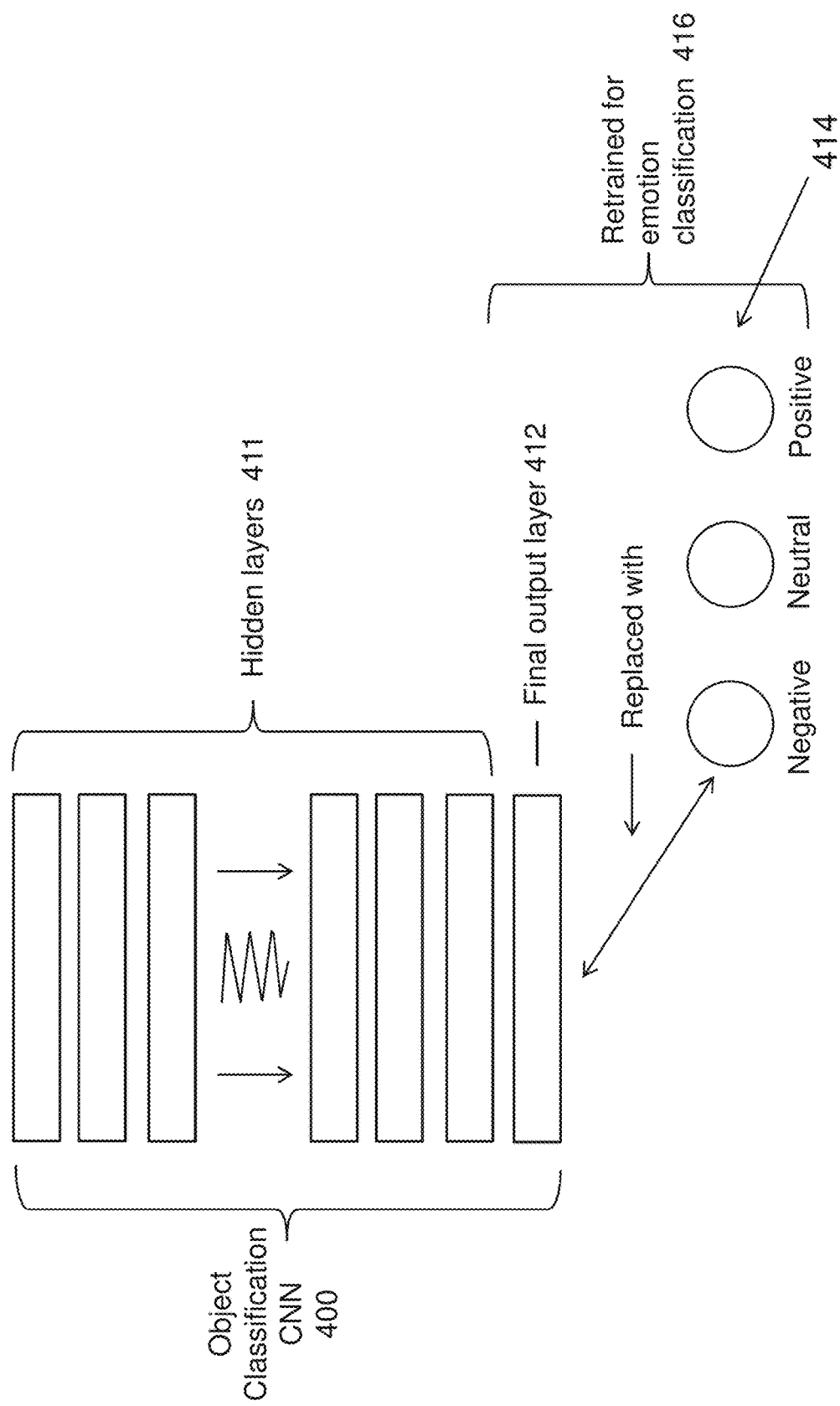
FIG. 4B is a block diagram of an example CNN undergoing modification or manipulation and retraining for operation with the system for rendering an image of FIG. 2.

In FIG. 3A, there is described an example of an emotion analysis engine 300 arranged to process and analyse an image 302 so as to provide an emotion rating 304 or score. As shown, the emotion analysis engine 300 receives an image 302 and firstly identifies one or more objects that are represented in the image 302. It follows that after this step, the emotion analysis engine 300 may then identify an emotion associated with the image 302. Preferably, in order to achieve these functions, the emotion analysis engine 300 may be implemented by a convolution neural network (CNN) trained to perform object classification and style extraction. The CNN may be firstly trained to perform object identification, such as by training with an object identification dataset, then followed by training the CNN with an image emotion dataset. Preferably, although not necessary, a modification or manipulation of the CNN in between each of the training sets allow certain parameters to be retained from each training, and thus allowing a CNN to retain some knowledge of an object identification training whilst being retrained with image emotion dataset to identify images with specific emotions. The advantage in this modification or manipulation of the CNN is that a transfer learning process is applied to the creation of the CNN, and may allow, in some instances, a loose and indirect, or even disassociated relationship between object identification and style identification by the CNN and thus allowing a greater accuracy for the CNN to identify an emotion from the rendering styles of an image, rather than from the contents of the image, whilst at the same time, offering an advantage that the CNN can nonetheless perform content or object identification that may be useful in certain situations, such as those of functions achieved by the system for rendering an image as described herein. An example of a CNN trained to performed these functions are shown in FIGS. 4A and 4B and will be described in further detail with respect to these figures.

Figure 3B:
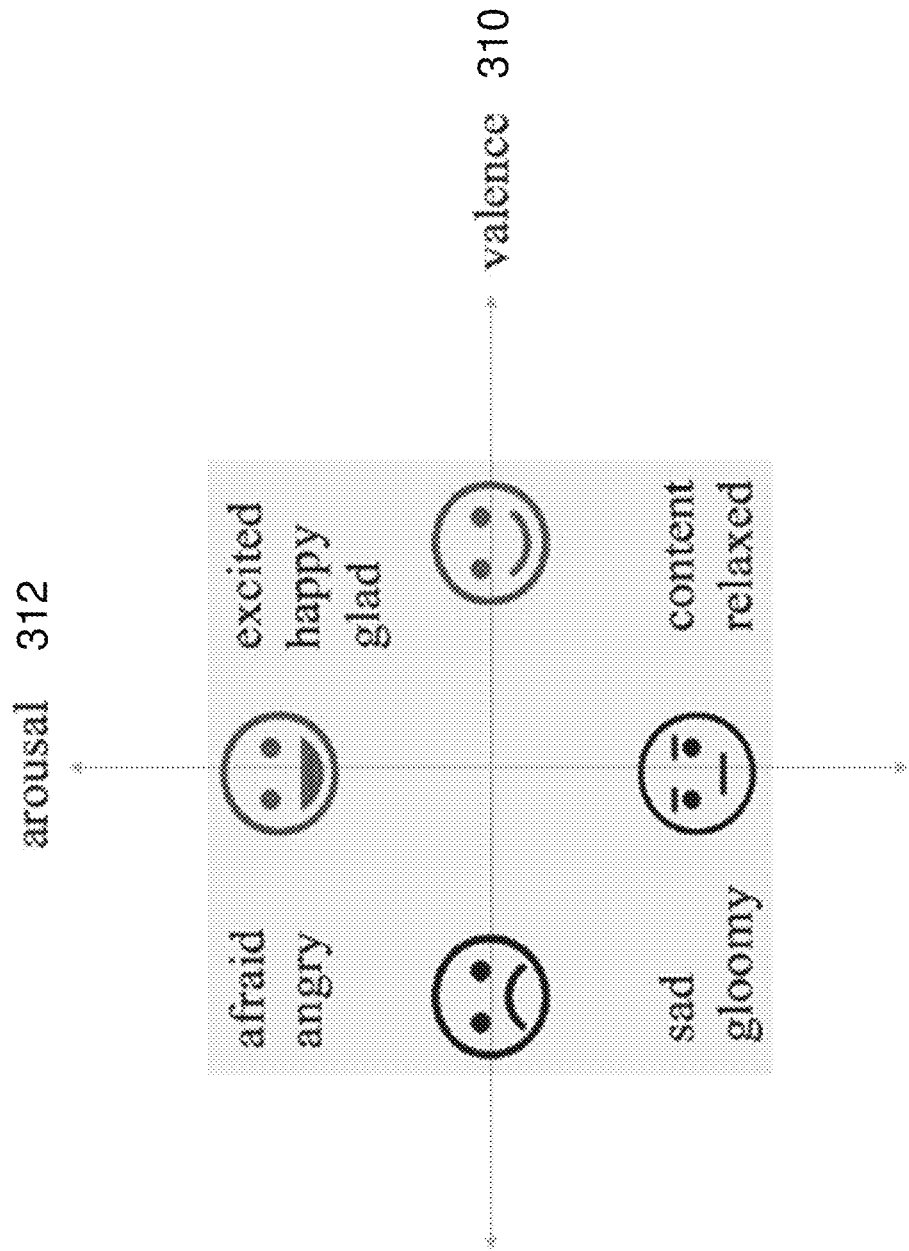
FIG. 3B is a chart illustrating an example of a valence-arousal (VA) emotion model which may be used by the emotion analysis engine of FIG. 3A.

In this example embodiment as shown in FIG. 3A, the emotion analysis engine 300 is arranged to analyse an image 302 to determine a score 304 or rating associated with one or more emotions. This score 304 may be a representative of the likely emotion response of the image 302 as it would be conveyed to a user when the user is given an opportunity to visually inspect the image 302. Preferably, a multi-dimension scoring system may be devised for the emotion analysis engine 300 to score the image 302. An example of this multi-dimension scoring system may be the Valence-Arousal emotion model (V-A model) as shown in FIG. 3B, in which a score representative of the emotion response of the image may be provided based on a rating of valence 310 and arousal 312. In turn, allowing an emotion of the image 302 to be devised and quantified within this model.

Figure 3C:
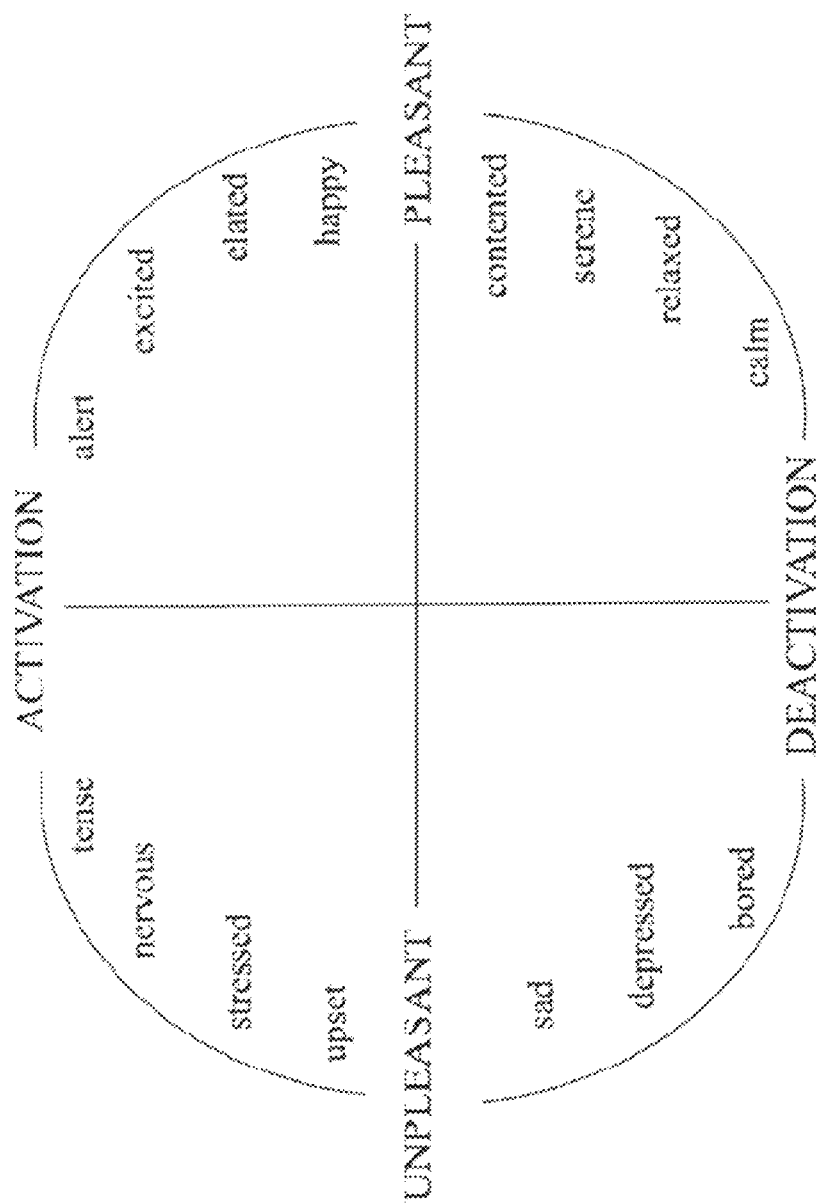
FIG. 3C is a chart illustrating an example of a circumplex model of affect which may be used by the emotion analysis engine of FIG. 3A.

As shown in FIG. 3B, the V-A model shows a grid made up of 2 dimensions with a score on the horizontal axis representing the valence level 310. Similarly, on the vertical axis is a score representing arousal level 312. By identifying a score for valence 310 and arousal 312, a point on the grid can devised an example emotion of a particular object or image that has been analysed. In turn, the emotion analysis engine 300 is arranged to devise a score for valence 310 and arousal 312 when using this V-A model. It is important to appreciate that other models are also possible, including a circumplex model of affect as shown in FIG. 3C. For these other models, it is simply a matter of implementing the emotion analysis engine 300 to provide scores to these different values relating to emotional responses. This may be performed by using a training dataset to train the emotion analysis engine 300 to recognize the parameters of this specific model.

Returning to FIGS. 3A, 4A and 4B, there is shown a preferred implementation of the emotion analysis engine 300. There are various methods in which an emotion analysis engine 300 may be implemented, including by use of machine learning, computerized learning processed or other statistical analytical tools, models or systems. Preferably, as shown in FIG. 4A, the emotion analysis engine is implemented by use of a neural network, and moreover in one example, by a Convolution Neural Network (CNN) 400.

In this example, the emotion analysis engine 300 is implemented by a CNN architecture that has been suitably trained to perform object identification 402 (or known as object classification). In these examples, and as shown in FIG. 4A the CNN 400 is pre-trained to perform object classifications, that is, the CNN 400 is pre-trained to identify objects that are shown in an input image 401. This can be performed by training the CNN with the ImageNet dataset (http://www.image-net.org/) which can be described to be a large collection of images with relevant associations with named objects that can be used to train a neural network to perform object classifications 402. As expected, other training data can be collated and used to achieve a similar purpose so as to train a CNN 400 for object classification only.

It follows in this example, that once the CNN 400 is pre-trained to perform object classification 402, by use of transfer learning, parts of the CNN can be re-trained to perform the emotion recognition process 404. In one example embodiment as shown in FIG. 4B, the weights of a CNN 400 as those found in the hidden layers 411 were initialized as the weights learned for object classification, thus taking advantage of the training already performed for object classification. However, the final output layer 412 of the CNN 400 is reinitialized so as to not use the weights of the pre-trained CNN 400.

In this way, the convolution layers 411 and fully-connected layers 411 of the pre-trained CNN 400 utilized the existing model structure of the pre-trained CNN 400 that can be used for object classification. However, the final output layer 412 will not. Instead, in this example embodiment, the number of output units in the output layer 412 was modified to 3 units 414, and only the last fully-connected layer 414 was retrained 416 with a training set from the International Affective Picture System (IAPS) dataset. This dataset, which includes numerous images with emotional scores, can therefore be used to re-trained the CNN 400 for the emotion recognition task using a 3-level scale (negative, neutral, positive) for both arousal and valence dimensions. This is achieved due to the existing pre-training which performs object classification, followed by training the CNN 400 to use the object classification functions to couple with the correlated emotional scores.

In turn, after recognizing the emotional score likely to be evoked by the images onto a user, an empirical approach may then be applied to extract the desired image features which are associated with this emotional score. This process is referred to as the "feature extraction" process. In some examples, where the emotional score is measured on a V-A scale, it would allow for the customization of the specific valence or arousal of a given image. It follows that once these desired image features are extracted, they may then be transferred onto an existing image so as to adjust the emotional score of the existing image.

In some examples, this process of feature extraction is performed by using a technique referred to as "style transfer". This technique extracts separate features that represent either the "content" or "style" of each image. For example, in Van Gogh's "Sunflowers" series, the content of each image is "sunflowers in a pot". The style of the image would be the colours, the blending of the colours, the visibility of the brushstrokes, and the general aesthetic quality of the painting technique. By using this process of "style transfer", it is possible to empirically extract "style" features from one or more images to find what "style" corresponds with a certain emotional value.

In this way, to change a negative image into a positive image, a subset of images labeled as "positive" can be used as the style to be rendered into negative images. In this case, an example image manipulation engine, operating similar to the image manipulation engine 210 as referenced in FIG. 2, may use a CNN such as VGG19. The CNN may be used to learn the content feature and style features respectively, then proceed to make a target image (initialized as a white noise image) match the style representation while preserving the content representation. In this regard, an example implementation of such an image manipulation engine 500 is described with reference to FIG. 5A below.

Figure 5A:
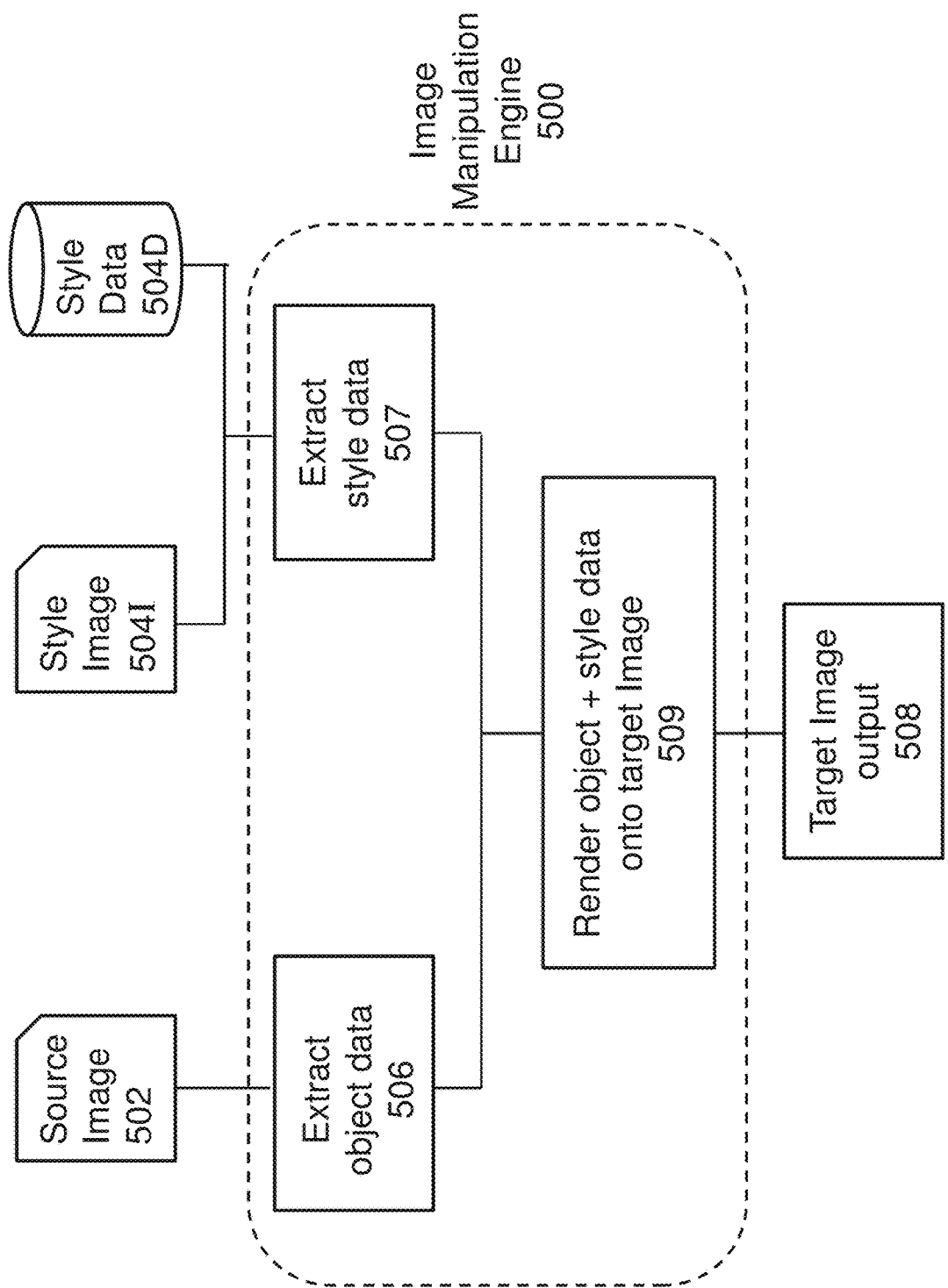
FIG. 5A is a block diagram of an example image manipulation engine as used in the system for rendering an image of FIG. 2.

With reference to FIGS. 5A, there is illustrated an embodiment of the image manipulation engine 500. As shown, the image manipulation engine 500 is arranged to take a source image 502, as inputted by a user, and to manipulate the source image 502 with a preferred style (in the form of a style image 504I or style data 504D) so as to present the source image 502 in a target image 508 and the target image 508 would be rendered with the preferred style. In turn, as the engine 500 is arranged to manipulate or otherwise adjust the rendering style of the objects as presented in the source image 502, it is able to adjust an emotional scale or score of the source image 502 to one that is desired by a user.

In this example embodiment, the image manipulation engine 500 uses a suitable pre-trained convolution neural network (CNN) such as the example of the CNN 400 as shown in FIG. 4B which has been trained to perform both object classification and emotion rating/scoring. Once trained, CNN 400 may then be used as part of the process to perform this image manipulation with the source image 502 and the style data, both of which may be supplied or inputted by a user. The source image 500 is an image or other forms of data that the user wishes to manipulate, whilst the style data is data associated with a desired emotional scale and may be presented in the form of a style image 504I or other forms of data 504D associated with preferred rendering styles.

Preferably, the CNN 400 is arranged to perform three major tasks in order to perform this image manipulation process. The first task is to identify and extract the object or objects 506 as shown in the source image 502 itself. This process may be referred to as the object classification process or the extraction of the content representation of an image 506.

The second task is to extract the style representation from the style data 507 such that these can be used to "manipulate" the source image 502 into the target image 508. The style data may itself be in the form of an image 504I that conveys a particular emotion rating, and would therefore be rendered in a particular rendering style that is associated with the emotion rating. Such rendering styles may include a choice of colours, rendering techniques (including lines, shapes, fills, tones etc), brightness, contrasts, edge shapes, blurriness, sharpness, soft rendering, hard rendering or any other rendering methods to present an image. In other examples, an image 504I may not be provided by the user but desired rendering styles data 504D may be presented instead.

Once the content representations 506 and the rendering styles 507 are extracted, the final step is to render the content representation with, or in combination with, the extracted the rendering style 509. In this regard, the rendering is performed by the CNN 400 onto a target image 508, which initially starts off in the rendering process as a random white noise image that has no style or content. As it will be explained below with reference to FIGS. 5B and 5C, the design of a trained CNN 400 is arranged to extract content and style representations with each layer propagation by the CNN, and due to the inherent structure of a CNN, as each layer is propagated, further and more detailed content and style information can be obtained and extracted, whilst on each extraction, the information can be captured, stored, or rendered onto the target image 508 until all layers of the CNN has been propagated, exhausting the amount information which can be extracted from the source image 502 or style data.

In turn, these extractions can effectively be rendered onto the target image 508 to create an output image that has the content or objects of the source image 502, whilst being presented via desired rendering styles to convey a specific emotion score. In this sense, the image manipulation process does not "manipulate" the source image 502, but rather extracts contents of the source image 502 and renders it onto a new target image 508, although the output image 508 can be observed by a user to have been created by "manipulating" the source image 502.

Figure 5B:
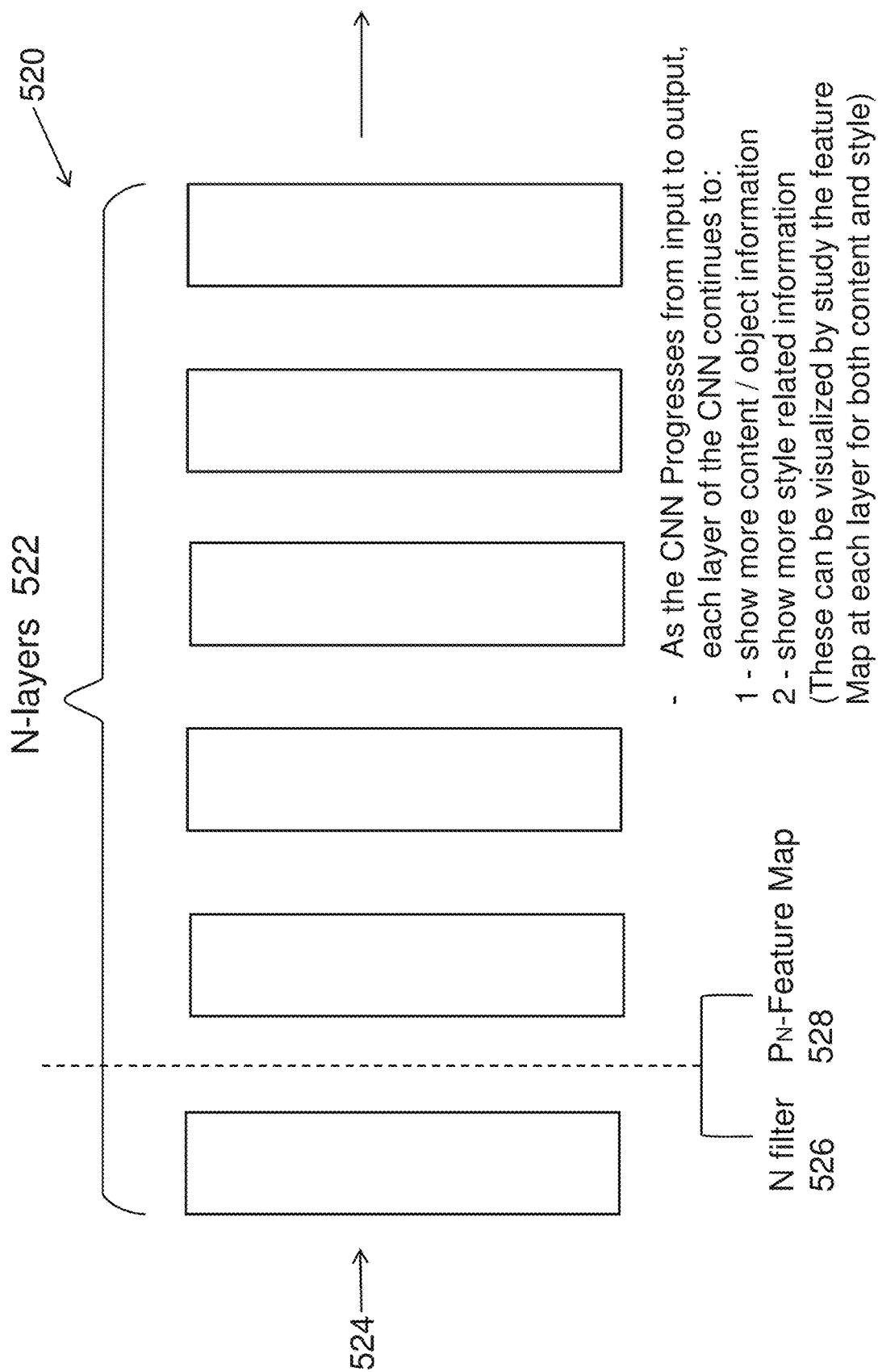
FIG. 5B is a block diagram illustrating the propagating processing of a trained CNN by the image manipulation engine of FIG. 5A; and, FIG. 5C is another block diagram illustrating the processing of the trained CNN and the rendering of a target image by the image manipulation engine of FIG. 5A.
Figure 5C:
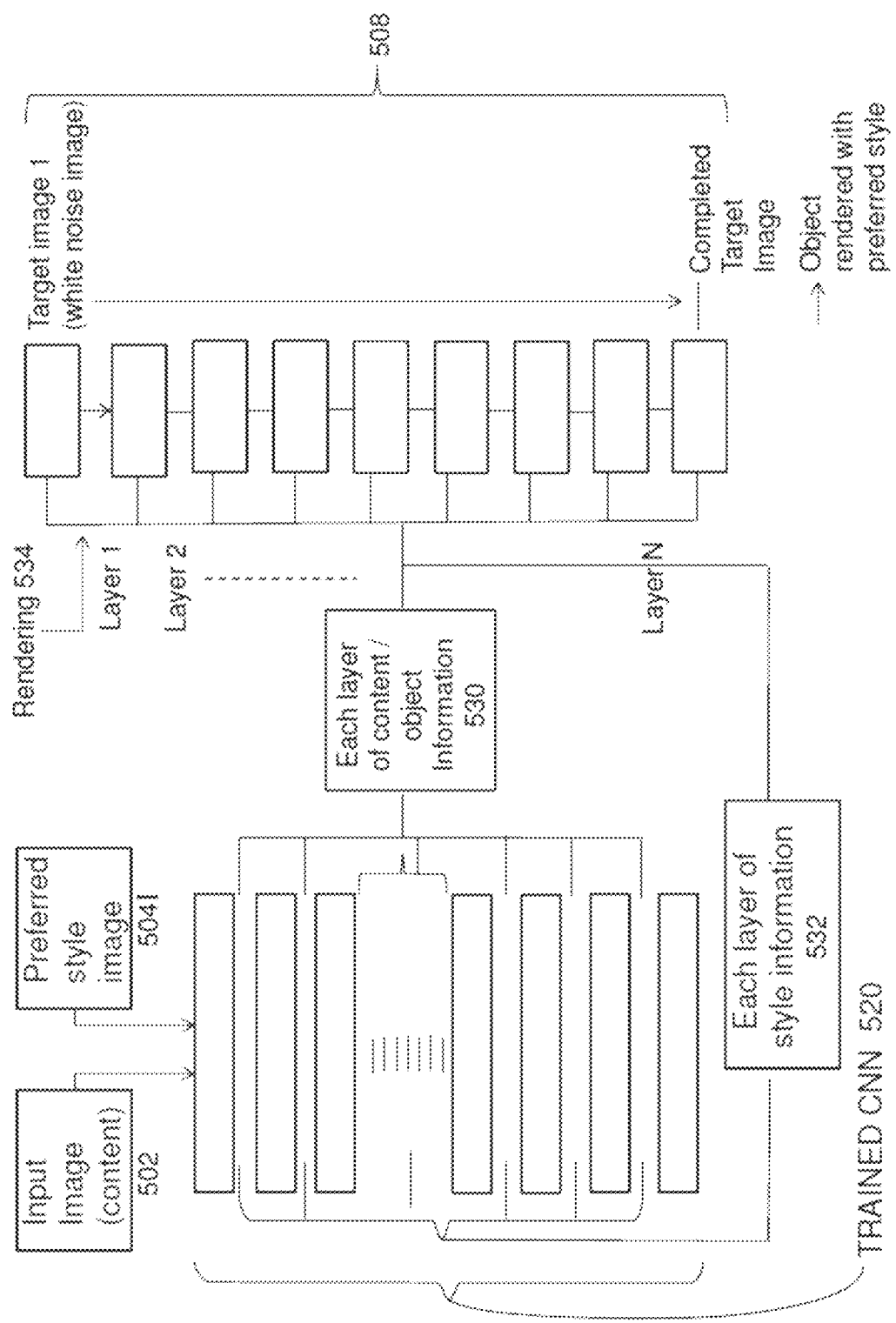

With reference to FIGS. 5B and 5C, there is illustrate a block diagram of a convolution neural network (CNN) 520 which had been pre-trained to perform both object classification (object identification) and emotion evaluation. This CNN 520, similar to structure to CNN 400 as shown in FIG. 4A, was trained with a training set having at least a large number of images that has known object classification as well as a large number of images that have known emotional rating. The net result of this training is that there is presented a CNN 520 which is able to perform object classification (e.g. identify the objects as shown in an image) and to provide an emotion score or rating when provided with an image as based on the rendering style of the image.

The structure of the CNN 520 as shown in FIGS. 5B and 5C includes a number of hidden layers 522 therein, with the design of a CNN 520 being arranged for propagated processing. That is, an input 524 (image or data) is processed by the nodes of each layer 522, with results leading to the activation of certain nodes, as determined based on weights and other parameters of the CNN 520, allowing for the propagation of values to the next layer until all of the layers have been processed. It is during this propagated processing that a filter may be applied in between each layer. This filter may be able to select parts of the content and style data for extraction, which in turns allow the content and style data to be rendered together onto the target image 508. Thus during the propagated processing of the CNN 520, extracted contents 530 and style 532 are rendered 534, layer by layer onto the target image 508 so as to create a target image 508 that includes elements of the contents and desired style.

Accordingly, and as shown in FIGS. 5B and 5C, the CNN 520 performs the content extraction 530 and style extraction 532 simultaneously on the inputted source image 502 and the inputted style image 504I.

To extract the content 530 of the inputted source image 502, the CNN performs the following steps:

1—Filter the content image (inputted source image) with N1 filters in each layer of the CNN 520;
2—As each layer progresses during the propagation through the layers of the CNN 520, more abstract object (content) information becomes known. This is because the CNN 520 was pre-trained for object recognition and thus as each layer is processed, the objects shown in the image becomes more apparent and identifiable;
3—Due to the inherent nature of the CNN 520, as the inputted source image is processed through each layer of the CNN 520, some visual content of the source image 502 is lost or otherwise "filtered" from the inputted image, although content classification is improved at each layer. This content loss can be reapplied to an initiate white noise image (x) again and again (with each new content loss at the adjacent layer of the CNN 520) until the white noise image X 508 is the same or substantial similar or otherwise associated as the original content image. 502 In turn, this white noise image X 508 becomes a replication of the objects that are shown in the source image 502, and is part of the target image 508 outputted to the user; and 4—Thus as the CNN 520 performs its processing through each layer, the operations around the CNN is that the content representation of the inputted source image is extracted 530 and then applied 534 onto a white noise random image 508 to create a target image 508 that would have the objects of the source image 502. Additionally, at each step of the application of the extracted representation onto the white noise random image 508, an optimizer can improve this rendering processing as it can minimize any errors between what is extracted and what is rendered by the CNN 520. An example optimizer may be the Adam Optimizer.

Thus in one example embodiment, these steps are able to extract content representation from any given input source image. As this image is filtered in each layer of the CNN, a filter 526, which can, in one example, each be implemented to have the size of $M_l \times M_l$, with the lth layer having N, distinct filters. In turn, the responses in the lth layer are stored in the matrix $F^l \in R^{N \times M}$, where $F^l$ is the activation value of the ith filter at index j in layer 1.

When a CNN 520, such as the VGG19, is trained with a dataset specific for object recognition, it may explicitly produce more and more object information through deeper hierarchy. Thus, the deeper the input image goes through the CNN 520, the higher the content feature that can be captured and extracted.

Given a chosen content layer 1, the content loss (loss between the content image and output image) may be defined as the Mean Squared Error between the feature map $P^l$ 528 of our content image p and the feature map $F^l$ of the generated image x in one example.

In this example embodiment, by applying standard error back propagation, the gradient with respect to the image x can be computed and refined. Therefore, the initial white noise image x can be modified again and again. This modification to the white noise image X, can be completed after the output in a certain layer of CNN is the same as the original source image p 502.

As illustrated above, a pre-trained CNN 520 for object classification can, upon further processing as described above, be arranged to extract content related information of the inputted source image 530. Accordingly, a pre-trained CNN, whether it be a separate pre-trained CNN or the same pre-trained CNN 520 as above, once trained for detecting and classifying rendering styles to emotion scores, can similarly be further processed to extract rendering styles from an inputted style image 504I that would include a desired rendering style. In turn, these extracted rendering styles can also be applied onto the white noise image X, layer by layer, to create the target output image 508.

In one example embodiment, the process in which the desired rendering style, as based on the emotion score desired can be extracted from an inputted style image 504I by the following steps:

1—Taking the N1 filters 526 (similar to the extraction of content related information above) and measure which features in the style layers are activated for the style image. This can be performed in one example by looking at responses for each filter to each style feature;

2—As the CNN propagates during process, the more high level of the elements of style is captured and thus can be extracted as style information.

In some implementation examples, the style representation may contain semantic information and may be constructed by the output of the $N_1$ filters in any layer of the CNN (such as the VGG19). Preferably, by computing the correlation between the responses of different filters that are expected to be taken from the spatial range of the feature map, the system is able to determine which features in the style-layers activate simultaneously for the style image.

The terminology that represents such computation may be referred to as the Gram matrix $G^l \in R^{N \times N}$. In which case, each entry in the Gram matrix G is defined as:

$$G_{ij}^l \in \Sigma_k F_{ik}^l F_{ik}^l$$

For two images produced the same entries of the Gram matrix, then these two images have the same style, but may not have the same content. Similar to content representation, the deeper the input image propagates through the CNN, the more higher-level elements of the style in the image would be captured. The total style loss (loss between the output image style and style of 'style image'), which is quite similar to the content loss, may in some examples, be calculated by the mean squared distance for the Gram matrices instead of the raw tensor outputs from specific layers.

In summation, examples of the image manipulation engine 500 may therefore be implemented by a pre-trained CNN 520 that includes specific filters 526 to extract content representations of the inputted source image 502 as well as rendering style related data from an inputted style image 504I which conveys a particular desired emotion in which a user wishes to apply to the source image 502. Once the style data 532 and the content representations 530 are extracted by the CNN 520, the style data and the content representations are combined 534 onto a random white noise image 508. Overtime in the processing performed by the CNN 520, the information extracted by the filters 526 at each layer becomes more detailed, which in turn, when combined 534 onto the random white noise image 508 over a number of iterations, produces a target image 508 which includes the content of the inputted source image and the style data extracted from the inputted style image. This final step of combining the extracted style data and the content representations onto the target image may also be referred to as the style transfer process.

In a preferred embodiment, the style transfer process can be performed by firstly taking a random white noise image and rendering content and style into it so that it includes content and style of the inputted source image and style image. In this example, the process operates to put the content back in (as captured above in each layer) by the filters of the CNN, whilst operating to minimize losses between the content information on each layer, when it is rendered into the white noise image. Effectively, the process is therefore to paint the content back onto the white noise image layer by layer.

At the same time, by taking the style representation of the desired style images, which are the desired styles) the desired style information of each layer is also rendered into the white noise image layer by layer.

Similarly, this process may be performed by minimizing the amount of noise at each layer of rendering.

The output of this image as generated by rendering information in each layer of the CNN onto the white noise image (target image) resembles the object in the content image and had the stylist attributes of the style image.

In one example embodiment, the image manipulation process operates by firstly obtaining the content representation of the target image and the style representation of the source image, then the style transfer can be ready to be perform. The process at this point starts with:

a random white noise image;

the style image that captures the style representation as desired by a user; and, the content representation as extracted from the inputted source image. The content representation is generated by minimizing the losses in the CNN such that the total style loss, content loss and the total variation loss (which ensured pixel wise smoothness) are at a minimum.

After these processes, the output image generated from the CNN (e.g. VGG19), and should resembled or at least have a recognizable association with the objects and corresponding overall arrangement of content image and had the stylist attributes of the style image.

The loss function may also be computed as $$L_{total}(p, a, x) = \alpha L_{content}(p, x) + \beta L_{style}(a, x)$$

wherein p is the content image, a is the style image, and the x is final image to be generated. And the $\alpha$ and $\beta$ are the respective contribution for content and style reconstruction.

To optimize this loss function, the gradient with respect to the pixel values of generated image may be computed by Adam optimizer.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for rendering an image comprising the steps of:

receiving (i) content data representative of one or more objects in a source image that evokes an emotional response and (ii) style data representative of one or more rendering styles of a style image; and processing, using a trained convolutional neural network including a pre-trained learning process, the content data and the style data, the processing including:

extracting object related information from the content data;

extracting rendering style related information from the style data; and rendering a target image using the extracted object related information and the extracted rendering style related information such that the target image corresponds to the source image and includes the one or more objects incorporated with the one or more rendering styles such that the target image evokes an emotional response that is different from the emotional response evoked by the source image;

wherein the trained convolutional neural network is created based on:

training a convolutional neural network using a first dataset containing images with known object classification to generate a first convolutional neural network arranged to perform object identification such that the first convolutional neural network is operable to process source images to extract object information from the source images;

replacing a final output layer of the first convolutional neural network with a layer of emotional states nodes arranged to represent emotional states while retaining parameters of the first convolutional neural network except the final output layer so as to generate a manipulated convolutional neural network; and training the manipulated convolutional neural network using a second dataset containing images with known emotion scores to generate the trained convolutional neural network.

2. A method for rendering an image in accordance with claim 1, wherein the pre-trained learning process is arranged to extract object related information from the content data by processing the content data with a plurality of iteration, wherein each iteration of processing reveals further object related information.

3. A method for rendering an image in accordance with claim 2, wherein the pre-trained learning process is arranged to extract rendering styles related information by processing the style data with the plurality of iterations, wherein each iteration of processing reveals further rendering styles related information.

4. A method for rendering an image in accordance with claim 3, wherein the target image is rendered by the pre-trained learning process arranged to combine the object related information and the rendering styles related information.

5. A method for rendering an image in accordance with claim 4, wherein the pre-trained learning process combines the object related information and the rendering styles related information with the plurality of iterations, wherein each iteration of processing renders the target image to include additional object related information and rendering styles related information.

6. A method for rendering an image in accordance with claim 5, wherein the each iteration of processing to render the target image is optimized.

7. A method for rendering an image in accordance with claim 6, wherein the rendering of the target image is optimized by minimizing losses with each iteration between the target image and the additional object related information and rendering styles related information.

8. A method for rendering an image in accordance with claim 7, wherein the target image is optimized by use of an Adam optimizer.

9. A method for rendering an image in accordance with claim 1, wherein the content data includes one or more images showing one or more objects, and the one or more images include the source image.

10. A method for rendering an image in accordance with claim 9, wherein the one or more images showing one or more objects are one or more frames of an image stream.

11. A method for rendering an image in accordance with claim 1, wherein the style data includes one or more images having a desired style.

12. The method of claim 1, further comprising:
processing the target image to determine an emotion score or rating representative of the emotional response evoked by the target image;
determining whether the emotion score is below a predetermined threshold; and
if the emotion score is below the predetermined threshold, further processing the target image using the pre-trained learning process to generate a further target image.

13. The method of claim 1, wherein the trained convolutional neural network comprises a VGG19 convolutional neural network.

14. A method for manipulating a convolutional neural network comprising the steps of:
training the convolutional neural network using a first dataset containing images with known object classification to generate a trained convolutional neural network arranged to perform object identification such that the trained convolutional neural network is operable to process source images to extract object information from the source images;
replacing a final output layer of the trained convolutional neural network with a layer of emotional states nodes arranged to represent emotional states while retaining parameters of the trained convolutional neural network except the final output layer so as to generate a manipulated convolutional neural network; and
training the manipulated convolutional neural network using a second dataset containing images with known emotion scores to generate a further trained convolutional neural network arranged to perform style-based emotion recognition such that the further trained convolutional neural network is operable to process style data to extract rendering style related information from the style data;
wherein the further trained neural network is arranged to:
extract object related information from content data representative of one or more objects in a source image;
extract rendering style related information from style data representative of one or more rendering styles of a style image; and
render a target image based on the extracted object related information and the extracted rendering style related information such that the target image corresponds to the source image and includes the one or more objects incorporated with the one or more rendering styles such that the target image evokes an emotional response that is different from an emotional response evoked by the source image.

15. A method for manipulating a convolutional neural network in accordance with claim 14, wherein the first dataset is obtained from ImageNet database.

16. A method for manipulating a convolutional neural network in accordance with claim 15, wherein the second dataset is obtained from International Affective Picture System (IAPS) database.

17. The method of claim 14, wherein the trained convolutional neural network comprises a VGG19 convolutional neural network.

18. A system comprising:
a processing unit arranged to:
receive (i) content data representative of one or more objects in a source image that evokes an emotional response and (ii) style data representative of one or more rendering styles of a style image; and
process, using a trained convolutional neural network including a pre-trained learning process, the content data and the style data, the processing including:
extracting object related information from the content data;
extracting rendering style related information from the style data; and
rendering a target image using the extracted object related information and the extracted rendering style related information such that the target image corresponds to the source image and includes the one or more objects incorporated with the one or more rendering styles such that the target image evokes an emotional response that is different from the emotional response evoked by the source image;
wherein the trained convolutional neural network is created based on:
training a convolutional neural network using a first dataset containing images with known object classification to generate a first convolutional neural network arranged to perform object identification such that the first convolutional neural network is operable to process source images to extract object information from the source images;
replacing a final output layer of the first convolutional neural network with a layer of emotional states nodes arranged to represent emotional states while retaining parameters of the first convolutional neural network except the final output layer so as to generate a manipulated convolutional neural network; and
training the manipulated convolutional neural network using a second dataset containing images with known emotion scores to generate the trained convolutional neural network.

19. The system of claim 18, wherein the trained convolutional neural network comprises a VGG19 convolutional neural network.

* * * * *